Jan. 16, 1968   B. STAHMER   3,363,508
ROCKET LAUNCHER

Filed April 19, 1965   5 Sheets-Sheet 2

INVENTOR.
BERNHARDT STAHMER
BY

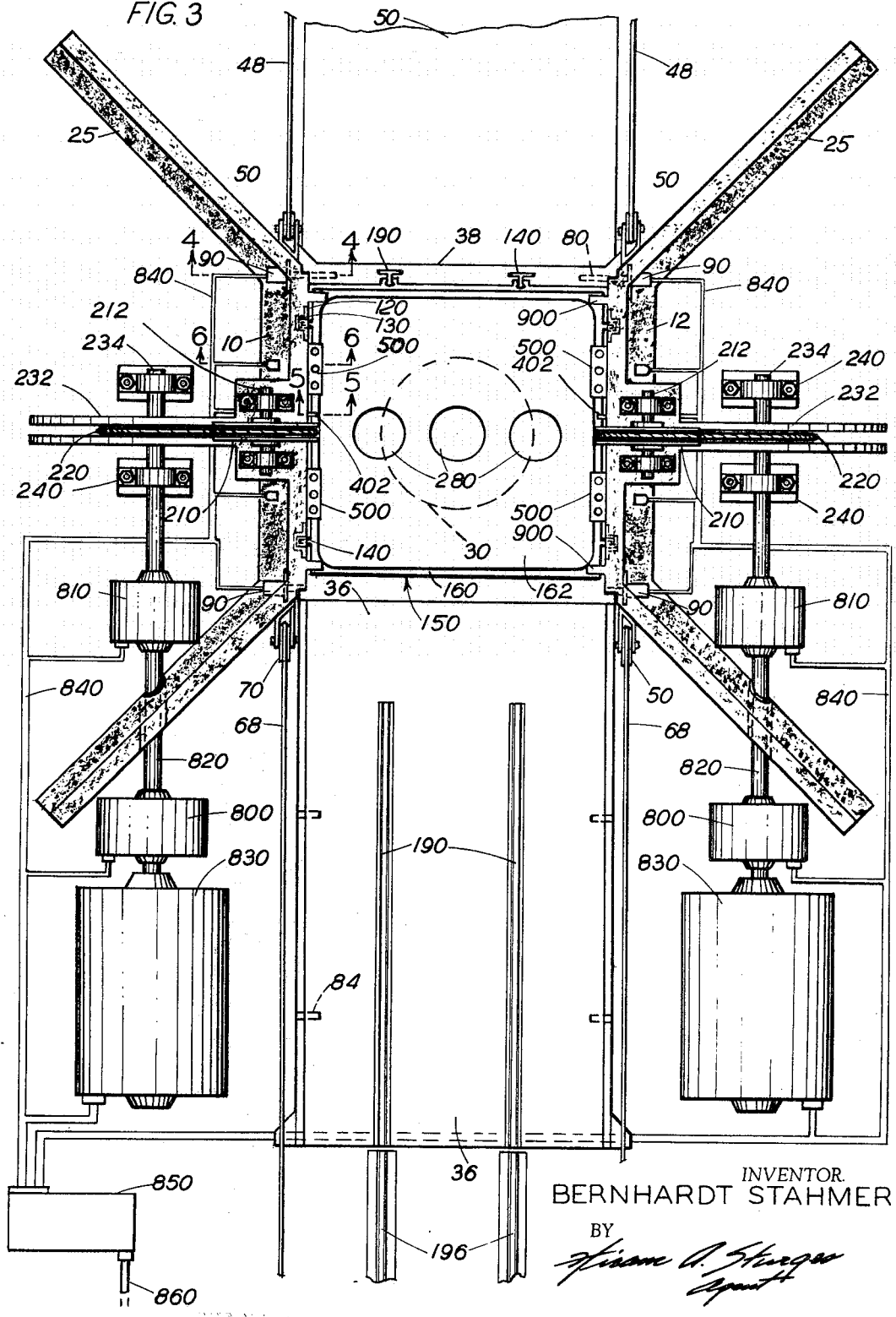

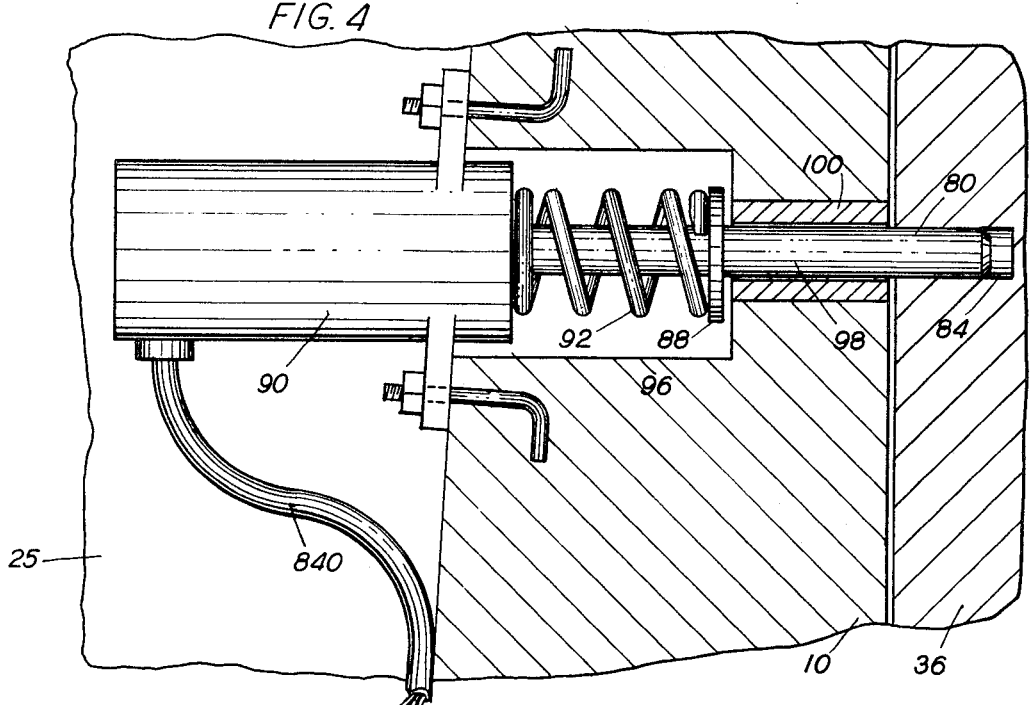
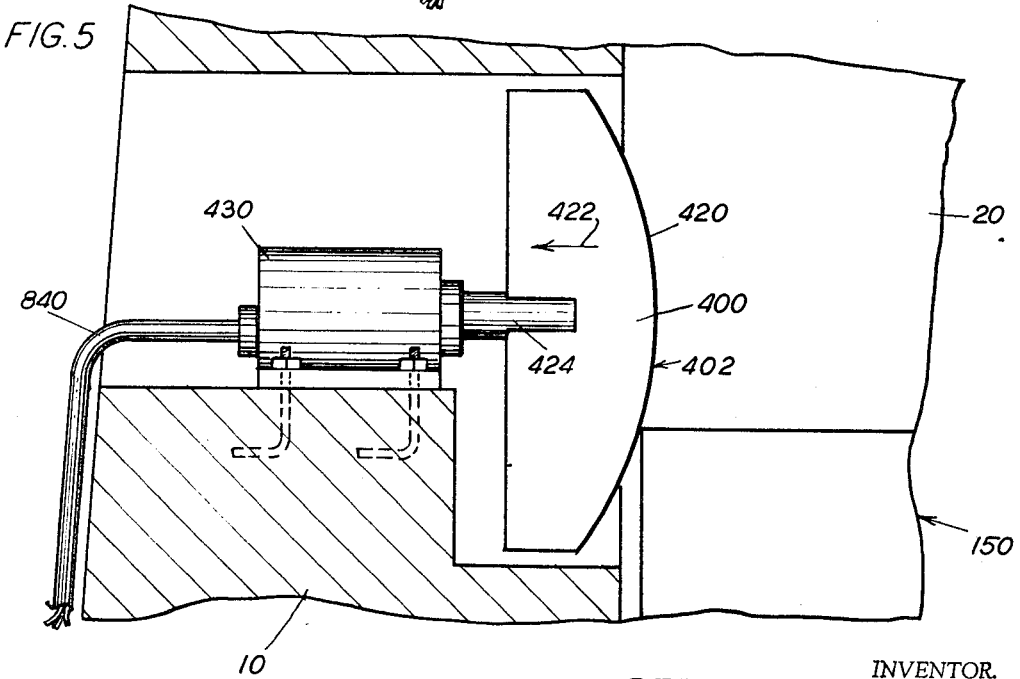

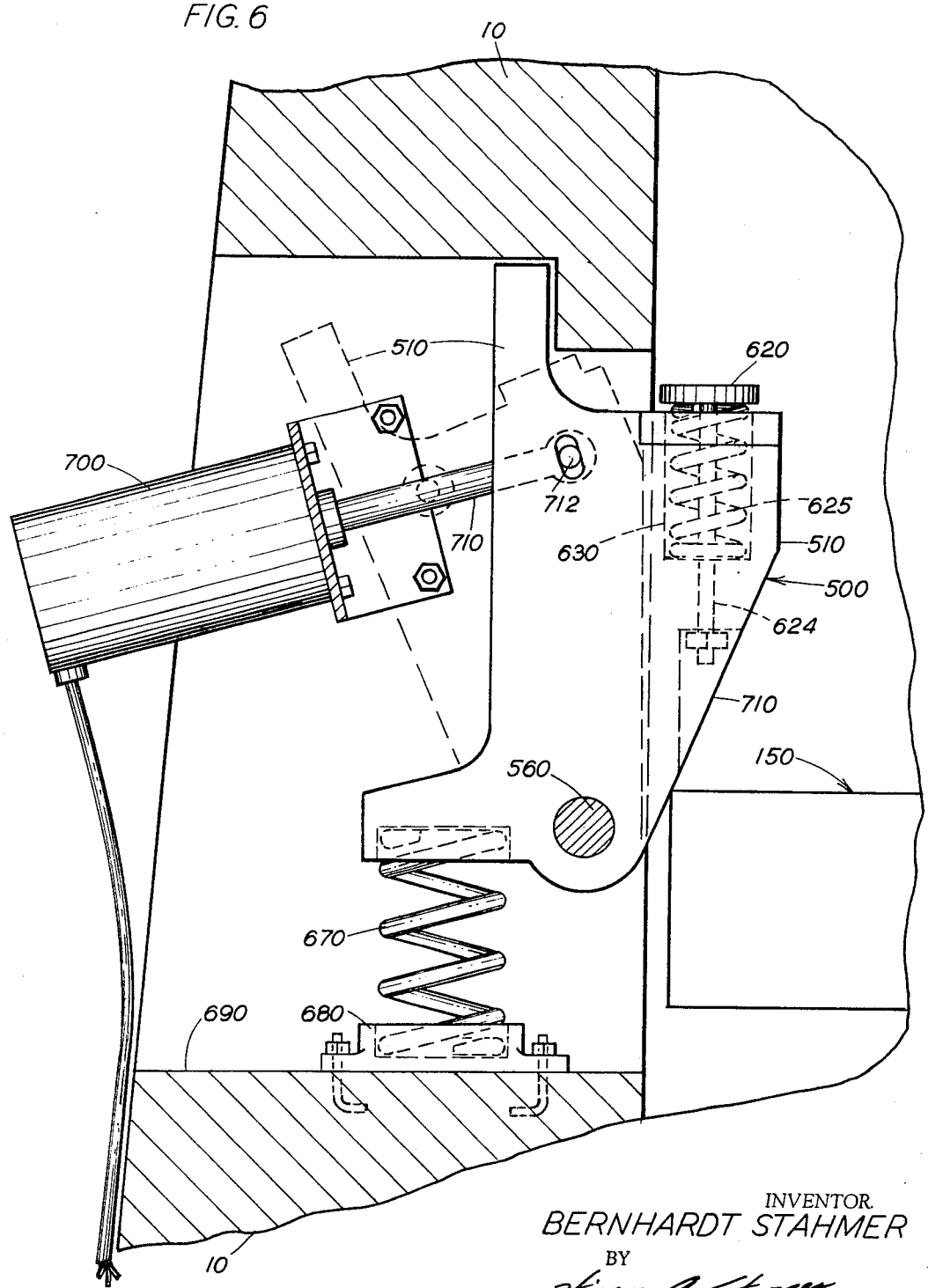

United States Patent Office 3,363,508
Patented Jan. 16, 1968

3,363,508
ROCKET LAUNCHER
Bernhardt Stahmer, 1509 Chicago St.,
Omaha, Nebr. 68102
Continuation-in-part of application Ser. No. 310,582, Sept. 23, 1963. This application Apr. 19, 1965, Ser. No. 449,931
5 Claims. (Cl. 89—1.818)

This invention relates to rocket launchers and more particularly it is an object of this invention to provide a rocket launcher having a platform disposed beneath the rocket and thrusting the rocket upwardly, the platform being lifted by permanently attached cable drawn by motors external to the rocket itself.

I am aware that the catapulting of rockets by the use of cables has been proposed before. However, it has never been proposed that a plurality of cables be attached to a single platform extending beneath the rocket. My proposed use of a platform in this manner distributes the stress on the heavy rocket over a broad area on the underside of the rocket and further my platform serves the added purpose of substantially filling the rocket launcher tube causing the exhaust gas pressure to be partially exerted against the underside of the platform for assisting the cables in boosting the platform and rocket with great speed and power.

I am further aware that others have used rocket launching tube filling platforms heretofore, but to my knowledge in no case has the platform served this combination purpose.

Permanently attaching powered cables to a boosting platform presents substantial problems in stopping the rocket platform before it has left the tube.

It is, therefore, an object of my invention to provide for the stopping of the rocket platform through three basic means:

(1) Resilient cushioning stop means directly in the way of upward movement of the boosting platform.

(2) Dependable switch controlled means for operating eddy current clutches to cut off driving power to cable winches from drive motors.

(3) Switch-controlled braking means for stopping the platform from going beyond the top of the rocket launching tube.

A very important object of the invention is to provide series-wound direct current motors for driving the cable winches whereby such motors can be operatively correlated with the thrust of the rocket whereby the platform applies lifting forces to the rocket until power to the platform-lifting motors is cut off by switch means, such lifting forces being applied irrespective of the speed of are rocket, as is possible because of the inherent characteristics of series-wound direct current motors whereby the rocket can exceed that speed of gravity-free fall without air resistance which an object would attain if it were to fall through a distance equal to the distance of movement of the platform in the launching tube during the application of pulling-power on the platform. In this way, considerable distinction is made in efficiency and possible power application from an earlier concept represented in a patent issued to T. Ongaro, titled, Vertical Catapult for Missiles, issued May 7, 1963, Patent No. 3,088,698.

A further object of the invention is to provide a launcher as described having series-wound direct current motors for making it possible to vary the power input to such series-wound direct current motors for adapting the launcher to rockets of many sizes, and to rockets carrying loads of varying weights, whereby the launcher is much more versatile in its use.

I am fully aware that compressed air has been used as an auxiliary power force to initiate launching. However, I am convinced that electrical motors used in the system described herein are a more efficient and much more effective means for launching than compressed air, especially when the motor power is applied through cables to a platform plugging the launching tube to utilize rocket engine exhaust gases for maximum pushing effect.

A further object is to provide resilient shock absorbing means mounted in a low part of the launcher for catching the boosting platform during its downward descent after a launching, the resilient shock absorbing means comprising retractable members removably mounted on the launcher in a manner for being disposed in operational positions in the path of descent, with means for moving the movable members from outward operating positions to retracted positions in which they are not in the path of the platform during its ascent.

This application is a continuation-in-part of the applicant's co-pending patent application Ser. No. 310,582, titled, Missile Launcher, filed Sept. 23, 1963, now abandoned.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 2 showing in dotted lines passages for exhaust gases and showing in dotted lines one of two pivoting doors in a partially loaded position.

FIGURE 3 is a top plan view of the rocket launcher of FIGURE 1.

FIGURE 4 is a sectional view taken along the lines 4—4 of FIGURE 3.

FIGURE 5 is a sectional view taken along the lines 5—5 of FIGURE 3.

FIGURE 6 is a sectional view taken along the lines 6—6 of FIGURE 3.

Figure 1:
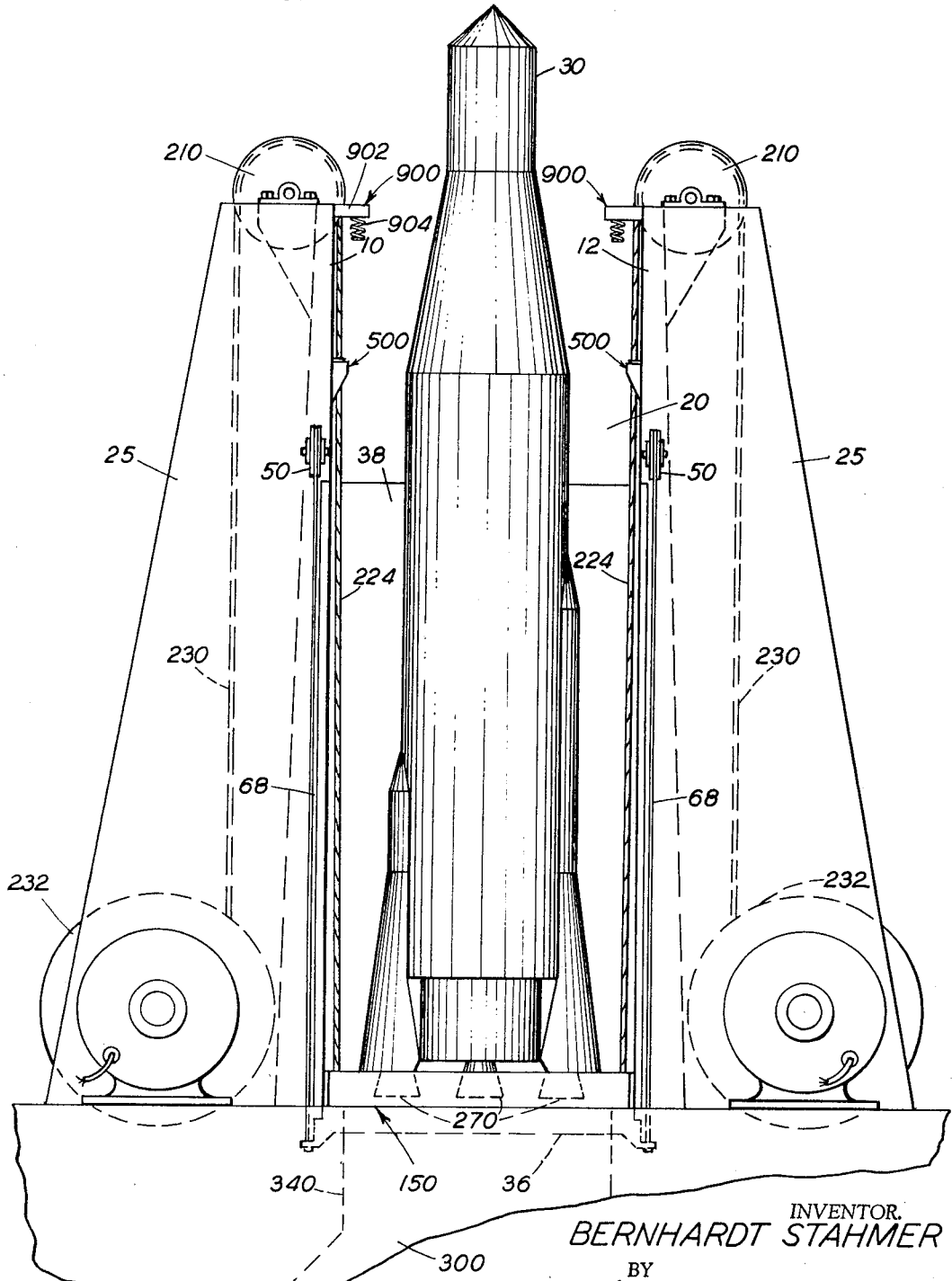
FIGURE 1 is a side elevation of the rocket launcher of this invention shown with the rocket mounted therein, and in a position preparatory to take-off.

Referring now to FIGURE 1 for a detailed description, two side walls 10 and 12 are found on the left and right sides of a rocket-receiving space 20 in the center of the launcher.

The side walls 10 and 12 extend vertically, and as best seen in FIGURE 3, they are supported by buttresses 25 which extend outwardly at an angle from the ends of each side wall 10 and 12. The rocket 30 is received in the space 20 and the space 20 is further enclosed with forward and rearward walls 36 and 38, best seen in FIGURE 3, in which the rearward wall 36 is disposed in an upright position tightly engaging at its ends the adjacent surfaces of the side walls 10 and 12. The forward wall 38, however, is shown in a horizontal position and it will be understood that the walls 36 and 38 are of like construction and that each of the walls 36 and 38 are adapted to be swung upwardly at their outer ends about a hinge means 40, best seen in FIGURE 2.

Figure 2:
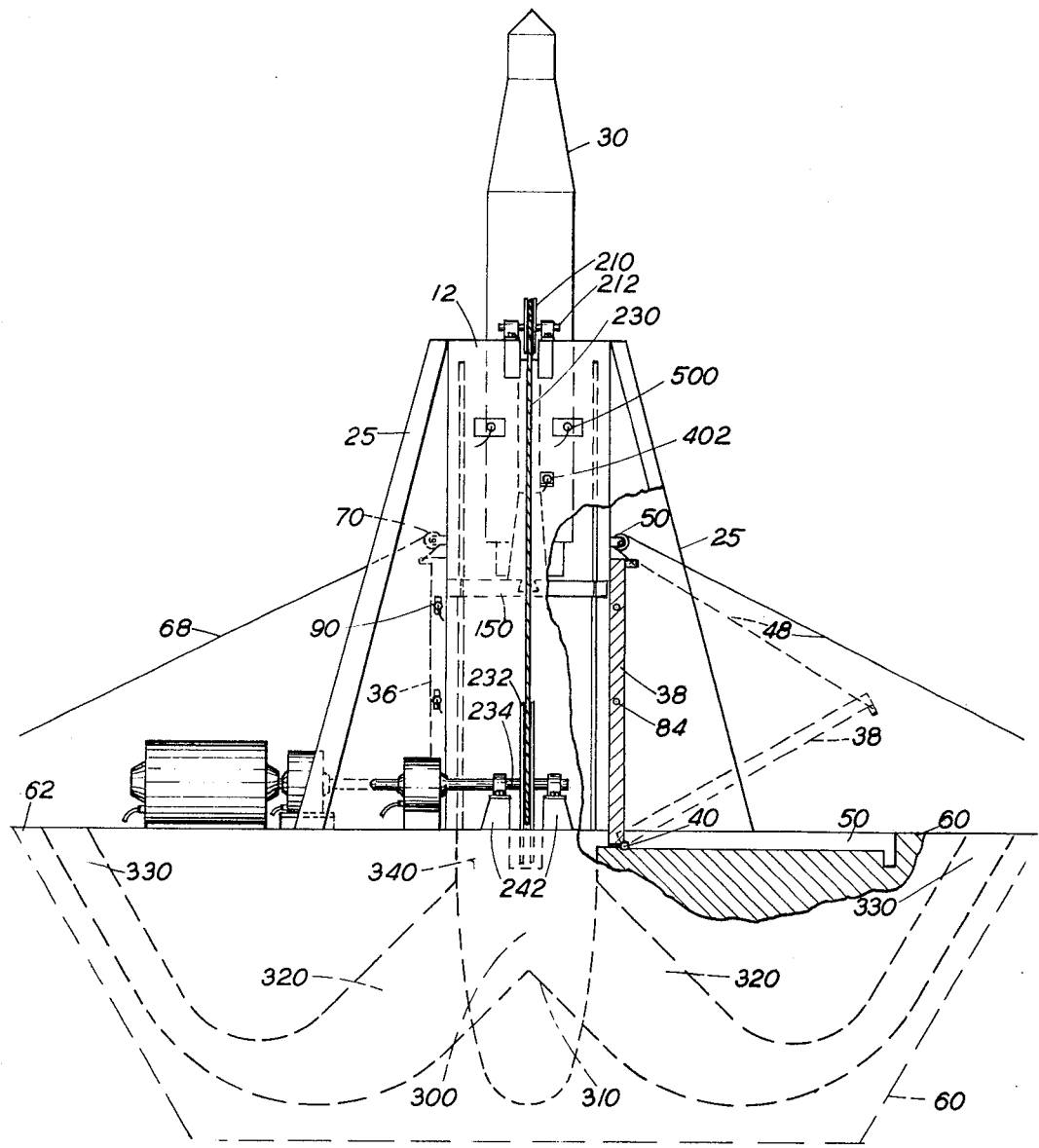
FIGURE 2 is a view of the launcher and rocket of FIGURE 1 as seen from the right-hand side at a time when the rocket is in a partially raised position but has not yet completely left the rocket launcher.

The forward and rearward walls 36 and 38 are lowered from a vertical position while supported by a cable 48, best seen in FIGURE 2, extending over a pulley 50 fixed to the side wall 12, and in FIGURE 2 a dotted line position of the forward wall 38 and dotted line positions of the cable 48 are shown.

When the forward wall 38 is in a downward position, it is received in a recess or pit 50 in the upper surface of a concrete base 60.

The base 60 is sunk into the ground below ground level 62 and extends downwardly a considerable distance beneath the rocket launcher.

The base 60 supports the side walls 10 and 12 and the hinge means 40.

A cable 68 and pulley 70 for the rearward wall 36 are also shown in FIGURE 2. The cable 68 and pulley 70 are of the same type as the pulley 48 and the pulley 50, and are for raising and lowering and vertically supporting the wall 36.

The forward and rearward walls 36 and 38 are firmly supported against the pressure of a rocket blast by pins best seen in FIGURES 1 and 3. These pins are given the number 80 and appear in dotted lines in FIGURE 3. As best seen in FIGURE 4, each pin 80 is adapted to be extended into a recess 84 in the respective wall or door 36 or 38, the remainder of each pin 80 extending into a solenoid 90 which latter can pull the pin out of the recess 84 when the solenoid is energized. Along each pin 80 and approximately in the longitudinal center thereof, is a collar 88 fixed to the pin 80 for receiving the pressure of a spring 92 against its solenoid side, the spring 92 bearing against the solenoid 90 at its other end and being coiled about the pin 80.

The solenoid 90 is mounted on one of the side walls 10 or 12 and the pins extend through a pair of openings 96 and 98 in the respective side wall 10 or 12, as best seen in FIGURE 4. The opening 96 is of larger diameter to receive the spring 92 and the opening 98 has its wall reinforced by a bushing 100 which is embedded in the wall 10 or 12, respectively. The walls 10 or 12 can be of concrete provided they are made thick enough, while the doors or forward and rearward walls 36 and 38 are preferably very strongly constructed of steel.

The solenoids 90 are each provided with a control and power cable as later described.

As best seen in FIGURE 3, each side wall 10 and 12 is provided with vertical track members 120 which are embedded in the respective wall 10 or 12.

The track members 120 are provided with vertically extending slots 130 therein opening upon the interior of the respective wall 10 or 12 and the purpose of the slots 130 are each to receive a vertical track 140 which is slidably received in its slot 130. Each track 140 is fixed to a platform generally indicated at 150.

The platform 150 has a vertical outer wall 160 extending upwardly from a horizontal portion 162. The tracks 140 are mounted on the vertical wall 160.

There are preferably at least four of the tracks 140 disposed two on each opposite side of the plaftorm 150 which are received in the members 120 of the walls 10 and 12.

The doors or swinging walls 36 and 38 are provided with rails 190 partially embedded in their upper sides, that is, their upper sides as seen when the doors 36 and 38 are in a downward position in which the door 36 is shown in FIGURE 3.

The rails 190 are on the inner side of the doors 36 and 38 when the doors are in the upper position as the door 38 is shown in FIGURE 3.

The rails 190 are for receiving a gantry crane thereon and when they are in lower position, they are disposed in alignment with other rails 196, whereby when a door 36 or 38 is down, a gantry crane can be moved on the rails 196 and 190 into a position for servicing the rocket 30.

At the top of each wall 10 and 12 and in the middle thereof between the side walls or doors 36 and 38 are a pair of pulleys 210 disposed for revolving about horizontal axles 212 mounted on the walls 10 and 12. The pulleys 210 are mounted with inner sides extended inwardly of the rocket space 20 beyond the respective walls 10 and 12 sufficiently that cables 220 disposed over the pulleys 210 can have downwardly extending vertical portions 224 thereof, best seen in FIGURE 1, extending directly vertically downward to the platform 150 to which they are suitably firmly connected in a manner not shown.

Each cable 224 has an outer vertical portion 230 extended downwardly from a respective pulley to a cable drum 232, best seen in FIGURE 3.

There are two drums 232 such suitably mounted for rotation on an axle 234 and the axles 234 are suitably mounted in bearing blocks 240, which latter are supported by pedestals 242, best seen in FIGURE 2.

The shafts 234 are connected to power driving means to be later described.

It will be understood that in operation, the platform is to be raised by the cables so as to boost the rocket to give it a take-off propellant independent of its own weight.

Referring to FIGURE 3, it will be seen that in takeoff, exhaust from three rocket nozzles 270 on platform 150 passes on through the underside of the platform with the exhaust passing into an underground chamber 300, best seen in dotted lines in FIGURE 2.

The chamber 300 has at its center an upwardly projecting conical portion 310 mounted on the other side of the chamber 300. In another way of describing, it can be said that the floor of the chamber 300 has a conically upwardly extending protrusion 310 for directing the exhaust gases from the rocket into three radially disposed discharge passages 320 seen in dotted lines in FIGURE 2.

It will be understood that the passages 320 extend outwardly in three different radial directions equidistantly spaced apart with respect to each other and that the passages 320 are larger at their inner ends and smaller at their outer ends. Each passage 320 first goes downwardly and outwardly and then curves upwardly so as to exhaust at arrows 330 at safe distances from the remainder of the mechanism of the rocket launcher.

With the construction described, it will be understood that pressure of exhaust gases will build up in the chamber 300 and will tend to push upwardly on the platform 150 inasmuch as an entrance to the center of the chamber is indicated at 340 and is disposed directly under the platform 150, the latter being best seen at 340 in FIGURE 1, it being understood that in FIGURE 1, the door 38 is to one side of the entrance 340.

As the platform 150 rises, it is also propelled upwardly by the cables 224 coming to a point.

As the platform moves upwardly, it eventually strikes a trigger 400 of a switch mechanism generally indicated at 402. The switch mechanism 402 is generally disposed approximately three-fourths of the distance upward from the lowermost position of the platform 150 to the pulleys 210, and the switch mechanism 402, as best seen in FIGURE 2 and shown in detail in FIGURE 5, has its trigger 400 provided with an arcuate surface 420 extending inwardly of the rocket space 20 in the pathway of the platform 150, whereby the surface 420 is arcuate and convex in side elevation, as seen in FIGURE 5, so that when the platform 150 strikes the surface 520, the trigger 400 moves outwardly in the direction of an arrow 422 moving a shaft 424 on which it is mounted. The shaft 424 which moves outwardly encloses a switch 430 in which it is mounted, and the switch 430 initiates the shutting off of motors to be later described.

The switch 430, when closed, also initiates the operation of brakes, that is, electrical brakes to be later described.

There are two switches 430, one mounted on the wall 10 and the other on the wall 12, as best seen at 402 in FIGURE 3, whereby one of the switches is extra and serves for safety. Both switches 430 are wired to serve the same purposes, however.

As best seen in FIGURE 6, and also seen in FIGURE 2, the platform moves upwardly until it has passed by a platform-catching mechanism generally indicated at 500. There are four platform-catching mechanisms 500, as best seen in FIGURE 3, disposed two on each wall 10 and 12, respectively. Each platform-catching mechanism has a retractable portion 510, which latter is disposed in a dotted line retracted position within the respective wall 10 or 12 in FIGURE 6, at times when the platform 150 is moving upwardly.

After the platform 150 has reached and gone beyond the platform-catching mechanisms 500, it will be understood that the exhaust pressure against the underside of the platform will have largely diminished because the doors 36 and 38 are disposed at a lesser height than the walls 10 and 12 to the end that the exhaust can escape over the tops of the doors 36 and 38 into the open air, whereby the back blast from the rocket 30 against the platform 150 will cause the platform to cease to move upwardly and to begin to move downwardly again inasmuch as by that time, the cables 224 are no longer pulling upwardly on the platform 150 because the motor later described has been shut off and brakes have been applied for shutting off the energy that is pulling up the cables 224.

So at a time when the platform 150 is again moving downwardly, it becomes necessary to catch it to prevent its destruction from moving downwardly unduly rapidly under the blast of the rocket 30 which has by that time left the top of the platform 150, whereby much of its exhaust is striking the platform 150 on its upper side.

As the platform 150 moves back downwardly, its underside strikes the upper sides of plungers 620, which latter have shanks 624 slidably extended through each respective retractable member 510, with a coiled spring 625 bearing against a larger upper end of each plunger 620 and rested on the bottom of a recess 630 extending downwardly into the respective retractable member 510 from the upper side thereof.

It wil be seen that there are a plurality of plungers 620 mounted on each retractable member 510, as best seen in FIGURE 3.

Referring to FIGURE 6, it will be seen that each retractable member 510 is adapted to pivot about a pin 660 fixed to the respective wall 10 or 12 and extending horizontally and that each retractable member 510 is urged toward an outer position for extending into the pathway of the platform 150 by means of a coiled spring 670 mounted in a receiver 680 on the bottom of an opening 690 in the wall 10 or 12, whereby the spring 670 forces upwardly against the underside of an outer portion of the retractable member 510 for forcing the inner part of the retractable member 510 inwardly.

After the platform 150 has been arrested in its downward fall so as to prevent its destruction, it can thereafter be lowered gradually into its initial position and thereafter the retractable members 510 can be retracted into the dotted line position shown in FIGURE 6 as is accomplished by the energizing of solenoids 700, which latter pull rods 710 fixed by pins 712 to the retractable members 510, whereby the solenoids 700 pull inwardly and retract the respective retractable member 510, in order that the platform 150 can pass by the retracted retractable member 510 freely on its next upward movement and also so that they can pass by the retractable members 510 for the downward movement of the platform 150.

It is also possible to control the solenoid 700 in a manner for causing the retractable members 510 to be in an outer position during upward movement of the platform 150. When this is done, the platform 150 will strike an inclined undersurface 710 of each retractable member 510 during the upward movement of the platform 150.

The drive means for the cable drums or cable winch reels 232 and their shafts 234 is provided through two clutches 800 which can be electrical clutches such as eddy current clutches or magnetic clutches.

The clutches 800 are disposed on the shafts 234 respectively and electric brakes 810 are also mounted one on each shaft 234.

On the opposite side of each clutch 800 from the respective brake 810 is a connector shaft 820 connecting that clutch 800 to one of two series-wound direct current motors 830.

Right and left wiring conduits 840 lead from the respective right and left hand side shut-off switches 402 to the right and left electric brakes 810 respectively, and to the right and left electric clutches 800 and motors 830 respectively and also the conduits 840 are each connected to a terminal box 850, the latter being connected to a power supply cable 860.

When the cut-off switches 402 are operated by the upward passing of the platform 150, the wiring in the conduits 840 and in the terminal box 850 causes the electrical clutches 800 to cut off drive from the motors and a short interval afterward, the brakes 810 are set for braking to stop the platform from going up to the pulleys 210.

The motors 830 are initially started by a switching arrangement not shown but operating at a pre-determined time synchronized with the degree of acceleration of the rocket at firing.

Also four spring stop mechanisms 900 at the top of each wall 25 are in the path of the platform to prevent the platform from going up to the pulleys 210. Each mechanism 900 has an anchor bracket 902 which is fixed to the wall 25, and to which a downwardly depending coil spring 904 is attached.

The conduit 840 has branch conduits 1000 leading to the motors 830. From the branches 1000 wires 1002 and 1004 lead to rheostats 1006 controlled by dials 1010.

In operation, the rheostats 1006 are set for operatively correlating the driving power of the series-wound direct current motors 830 with the thrust of the rocket 30, whereby the platform 150 continuously applies lifting forces to the rocket 30 until power to the motors 830 is cut off by switch means 402 responsive to the reaching of the switch means 402 by the platform 150 during forward movement of the platform 150, whereby the switch means 402, when operated, cuts off power to the direct current motors 830 so that the motors provide no more power indirectly to the platform, the switch means 402 of FIGURE 5 also actuating eddy current clutch means 800 for disconnecting the drive trains to the pulleys 232 for preventing momentum of the motors and their shafts from further driving the reels.

At the same time, the switches 402 control power to the electric brakes 810 so that upon the actuation of the switch means 402 by the platform 150, then the power to the electric brakes 810 is applied through the conduits so that the brakes are actuated to stop the momentum of the shaft 234 and the reel 232.

The steps preceding launching are to start the electrical motors and the rocket engines. At first the rocket will not move and the slip clutches will slip. Gradually, the compressed exhaust gases building up under the platform will take greater and greater effect, power from the engines through slip clutches will take greater and greater effect, both assisting the rocket to the point of beginning of rocket motion. The rocket will then accelerate throughout the remainder of its movement through the rocket launcher.

Of great significance is the fact that if the rocket were to accomplish, by extra power, sufficient power to equal that supplied by the motor and cable drive, then the extra rocket engine weight needed for this would itself substantially add to the rocket inertia making launching less effective.

From the foregoing description, it is thought to be obvious that a rocket launcher constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A vertical rocket launcher having walls defining a launching tube having a vertical opening therein, a boosting platform extending approximately horizontally across said launching tube for receiving the underside of a rocket thereon, said boosting platform having opening means extending vertically therethrough disposed so as to be positioned beneath nozzles of said rocket, said platform having sufficient closing area so as to substantially plug remaining space in said tube between a rocket and said tube whereby a pressure of gas beneath said platform will tend to boost said platform, and power means comprising cables permanently attached to said platform during operation for pulling upwardly on said platform, said power means further comprising series-wound direct current electrical motors and means drivably connecting said motors to said cables, and switch means partially mounted at an upper position on said launching tube and partially mounted on said platform for the operation of said switch means responsive to the reaching of said switch means by said platform during the upward movement of said platform, said switch means being disposed above the lower position of said platform and connected to said power means whereby when said switch means is operated this cuts off said power means so that said power means ceases to further raise said lifting platform, in further combination with a rocket, said series-wound direct current motors being operatively correlated with the thrust of said rocket whereby said platform continuously applies lifting forces to said rocket until power to said motors is cut off by said switch means, such lifting forces being applied irrespective of the speed of said rocket because of the inherent characteristics of series-wound direct current motors, the said rocket exceeding that speed of gravity-free fall without air resistance which an object would attain if it were to fall through a distance equal to the distance of movement of said platform in said tube during launching.

2. The combination of claim 1 in further combination with eddy current clutch means and brake means each forming part of the said means drivably interconnecting said motors and said cables, said switch means being operably connected to said eddy current clutch means and said brake means for causing said eddy current clutch means to cut off driving connection from said motors and said brake means to brake the motion of the remainder of said drivable interconnecting means.

3. In a rocket launcher having walls defining a launching tube having a vertical opening therein, a boosting platform extending approximately horizontally across said launching tube for receiving the underside of a rocket thereon, said boosting platform having opening means extending vertically therethrough disposed so as to be positioned beneath nozzles of said rocket so that exhaust gases from said nozzles enter the area beneath said platform, said platform having sufficient closing area so as to substantially plug remaining space in said tube between said rocket and said tube whereby the pressure of gas from said nozzles in the area beneath said platform will tend to boost said platform, and power means comprising cables permanently attached to said platform during operation for pulling upwardly on said platform, said power means further comprising electrical motors and means drivably connecting said motors to said cables, and switch means partially mounted at an upper position on said launching tube and partially mounted on said platform for the operation of said switch means responsive to the reaching of said switch means by said platform during the upward movement of said platform, said switch means being disposed above the lower position of said platform and connected to said power means whereby when said switch means is operated this cuts off said power means so that said power means ceases to further cause raising of said lifting platform.

4. A vertical rocket launcher having walls defining a launching tube having a vertical opening therein, a boosting platform extending approximately horizontally across said launching tube for receiving the underside of a rocket thereon, said boosting platform having opening means extending vertically therethrough disposed so as to be positioned beneath nozzles of said rocket so that exhaust gases from said nozzles enter the area beneath said platform, said platform having sufficient closing area so as to substantially plug remaining space in said tube between said rocket and said tube whereby the pressure of gas from said nozzles in the area beneath said platform will tend to boost said platform, and power means comprising cables permanently attached to said platform during operation for pulling upwardly on said platform, said power means further comprising series-wound direct current electrical motors and means drivably connecting said motors to said cables, and switch means partially mounted at an upper position on said launching tube and partially mounted on said platform for the operation of said switch means responsive to the reaching of said switch means by said platform during the upward movement of said platform, said switch means being disposed above the lower position of said platform and connected to said power means whereby when said switch means is operated this cuts off said power means so that said power means ceases to further raise said lifting platform, whereby power input to said series-wound direct current motors can be varied for adapting said launcher to rockets of many sizes.

5. The combination of claim 3 in further combination with slip clutch means and brake means each forming a part of said means drivably interconnecting said motors and said cables, said switch means being operably connected to said slip clutch means and said brake means for causing said slip clutch means to cut off driving connection from said motors and said brake means to brake the motion of the remainder of said drivable interconnecting means.

References Cited

UNITED STATES PATENTS

| 2,379,267 | 6/1945 | Wilson | 244—63 |
| 3,084,599 | 4/1963 | Webster et al. | 89—1.818 |
| 3,088,698 | 5/1963 | Ongaro | 244—63 |
| 3,100,421 | 8/1963 | Moy | 89—1.81 |

FOREIGN PATENTS 727,060   10/1942   Germany.

SAMUEL W. ENGLE, *Primary Examiner.*

BENJAMIN A. BORCHELT, *Examiner.*